United States Patent
Fields et al.

(10) Patent No.: US 6,539,420 B1
(45) Date of Patent: Mar. 25, 2003

(54) DISTRIBUTION MECHANISM FOR REUSE OF WEB BASED IMAGE DATA

(75) Inventors: Duane Kimbell Fields, Austin, TX (US); Thomas Preston Gregg, Round Rock, TX (US); Sebastian Daniel Hassinger, Blanco, TX (US); William Walter Hurley, II, Round Rock, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/325,400

(22) Filed: Jun. 4, 1999

(51) Int. Cl.[7] ............................................... G06F 13/14
(52) U.S. Cl. ........................ 709/206; 709/224; 710/10
(58) Field of Search ................................ 709/201, 203, 709/224, 227, 232, 248, 222, 205, 206; 358/1.2; 710/10

(56) References Cited

U.S. PATENT DOCUMENTS

| | | | | |
|---|---|---|---|---|
| 5,734,823 A | | 3/1998 | Saigh et al. ................. 709/203 |
| 5,787,262 A | | 7/1998 | Shakib et al. ............... 709/224 |
| 5,860,073 A | | 1/1999 | Ferrel et al. ................ 707/522 |
| 5,884,014 A | * | 3/1999 | Huttenlocher et al. ...... 709/201 |
| 5,893,127 A | | 4/1999 | Tyan et al. .................. 707/513 |
| 6,011,905 A | * | 1/2000 | Huttenlocher et al. ...... 709/201 |
| 6,052,711 A | * | 4/2000 | Gish ........................... 709/203 |
| 6,064,397 A | | 5/2000 | Herregods et al. .......... 345/435 |
| 6,275,301 B1 | * | 8/2001 | Bobrow et al. .............. 358/1.2 |
| 6,326,983 B1 | | 12/2001 | Venable et al. ............. 345/763 |

FOREIGN PATENT DOCUMENTS

JP 8166956 6/1996

* cited by examiner

Primary Examiner—Ayaz Sheikh
Assistant Examiner—Khanh Quang Dinh
(74) Attorney, Agent, or Firm—Jeffrey S. LaBaw; Joseph R. Burwell; David H. Judson

(57) ABSTRACT

A method for reuse of image data in a distributed computer network is operative at a web server in response to a request from a client browser for a web page. At the web server, a determination is made regarding whether the web page includes a given object reference. If so, a template defining a composite image is retrieved. The template identifies at least one image object to be retrieved from another location, typically from a host remote to the web server. Once the image object is retrieved, a given transform is applied to the image object to generate a transformed image object. The given transform, for example, is selected from a group of transforms such as: scaling, mirroring, cutting, cropping, inverting, flipping, reversing, rotating, color shifting, and combinations of the above. Thereafter, the transformed image object is mapped into the composite image according to the template. After the composite image is created, it is served within the web page originally requested by the client.

24 Claims, 3 Drawing Sheets

DISTRIBUTION MECHANISM FOR REUSE OF WEB BASED IMAGE DATA

BACKGROUND OF THE INVENTION

1. Technical Field

The present invention relates generally to data distribution in a computer network. More particularly, the invention relates to managing and formatting electronically-published material distributed over a computer network.

2. Description of the Related Art

The World Wide Web is the Internet's multimedia information retrieval system. In the Web environment, client machines effect transactions to Web servers using the Hypertext Transfer Protocol (HTTP), which is a known application protocol providing users access to files (e.g., text, graphics, images, sound, video, etc.) using a standard page description language known as Hypertext Markup Language (HTML). HTML provides basic document formatting and allows the developer to specify "links" to other servers and files. In the Internet paradigm, a network path to a server is identified by a so-called Uniform Resource Locator (URL) having a special syntax for defining a network connection. Use of an HTML-compatible browser (e.g., Netscape Navigator or Microsoft Internet Explorer) at a client machine involves specification of a link via the URL. In response, the client makes a request to the server identified in the link and, in return, receives a document or other object formatted according to HTML.

Among the many challenges in running a successful web site is the constant creation and updating of the web pages and other files, i.e. web content, to keep the site fresh and new and attractive to web users. Web sites that do not update their content on a regular basis tend to lose their favor. Eventually, fewer "hits" are logged on the web site's pages as fewer users view the information or advertisements that the web site is publishing. Of course, the constant update of the web content, while necessary to maintain the popularity of the site, is very expensive in terms of manpower and time.

To address this problem, it has been proposed to enable a hosting web site to reuse given content from a set of content provider web sites within the "look and feel" of the host site. This technique is described in Serial No. 09/113,678, filed Jul. 10, 1998, titled "Distribution Mechanism For Filtering, Formatting And Reuse of Web Based Content," Attorney Docket No. AT9-98-134, and assigned to the assignee of this application. That application describes a method of managing copyrighted content on the Internet and World Wide Web by means of a filtering and formatting service located on a hosting server. In particular, an automated system is provided for replicating published web content and associated advertisements in the context of a hosting web site. At the hosting web site, method includes the steps of brokering a client browser's request for a web page, analyzing the returned content and splitting it into component elements, extracting desired component elements, recasting the desired elements in the look and feel of the hosting site, and sending the recast content to the requesting client as a web page. Once the reformatted file is received at the client, the client browser interprets the HTML in the web page, presenting the content in the context of the hosting web site.

While this technique provides numerous advantages, it is directed to reuse of text-based content and content identified by given text. As is well-known, however, the web includes a tremendous amount of graphical-based content. Just as in the case of text, it would be highly desirable for a given hosting site to be able to identify and reuse image components from one or more content providers. Thus, for example, a given site may host a weather map of the entire United States that is continuously updated. Given hosting sites, however, may wish to have images of different states represented on their sites. To achieve this function, the hosting site typically fetches the overall map and then uses an editor (e.g., Photoshop) to clip that portion of the map that is desires to host. This approach, has a significant disadvantage in that the clipped image is not updated automatically as the larger image changes. Thus, depending on the refresh cycle, there is likely to be some time lag until the image on the hosting site accurately reflects actual weather conditions.

Although the above is just one example, there is a need in the art to provide a mechanism by which images or image components may be processed and reused "on-the-fly" as a given web page is served from a hosting site to a client. The present invention solves this important problem.

SUMMARY OF THE INVENTION

A composite image is defined as comprising a template whose missing element(s) are filled in "on-the-fly" by retrieving existing image objects, extracting specified portions thereof, applying given transformations to the specified portions, and then reassembling the composite image before its delivery in association with a web page.

According to one embodiment, a method for reuse of image data in a distributed computer network is operative at a web server in response to a request from a client browser for a web page. At the web server, a determination is made regarding whether the web page includes a given object reference. If so, a template defining a composite image is retrieved. The template identifies at least one image object to be retrieved from another location, typically from a host remote to the web server. Once the image object is retrieved, a given transform is applied to the image object to generate a transformed image object. The given transform, for example, is selected from a group of transforms such as: scaling, mirroring, cutting, cropping, inverting, flipping, reversing, rotating, color shifting, and combinations of the above. Thereafter, the transformed image object is mapped into the composite image according to the template. After the composite image is created, it is served within the web page originally requested by the client.

A given template for an image typically includes one or more graphical regions (i.e. pixel sets) that are predefined to include image objects retrieved from one or more servers in the network. Thus, the template is a starting point for the creation of a composite that comprises a background and at least one missing graphical region. The graphical region may be any convenient shape, such as rectangular, circular, or the like. Although not required, an image object retrieved from another server in the network is first transformed in some way prior to being pasted into its corresponding geographical region in the template. By using a template, different image elements may be composited together (as defined by the template) from distinct sources prior to serving the composite (as part of the originally-requested web page).

According to another embodiment of the present invention, a given template may be programmatic. Thus, for example, rather than using a preexisting or static template, a given template may be built "on-the-fly" in a dynamic manner. As an example, when the client request is received, it may be parsed for given identifying information, which is then used to identify a given template for hosting the given image data.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following.

BRIEF DESCRIPTION OF THE DRAWINGS

For a more complete understanding of the present invention and the advantages thereof, reference should be made to the following Detailed Description of the Preferred Embodiment taken in connection with the accompanying drawings in which.

DETAILED DESCRIPTION OF THE DRAWINGS

Figure 1:
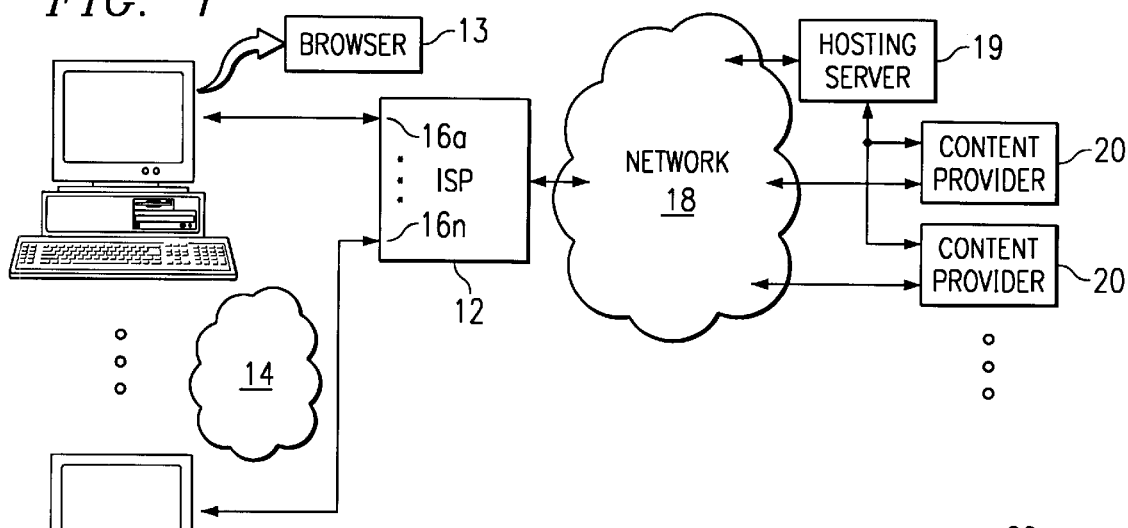
FIG. 1 is a representative system in which the present invention is implemented.

A representative system in which the present invention is implemented is illustrated in FIG. 1. A plurality of Internet client machines 10 are connectable to a computer network Internet Service Provider (ISP) 12 via a network such as a dialup telephone network 14. As is well known, the dialup telephone network usually has a given, limited number of connections 16a–16n. ISP 12 interfaces the client machines 10 to the remainder of the network 18, which includes the hosting server 19 and a plurality of web content provider server machines 20. A client machine typically includes a suite of known Internet tools, including a Web browser 13, to access the servers of the network and thus obtain certain services. These services include one-to-one messaging (e-mail), one-to-many messaging (bulletin board), on-line chat, file transfer and browsing. various known Internet protocols are used for these services. Thus, for example, browsing is effected using the Hypertext Transfer Protocol (HTTP), which provides users access to multimedia files using Hypertext Markup Language (HTML). The collection of servers that use HTTP comprise the World Wide Web, which is the Internet's multimedia information retrieval system.

Figure 2:
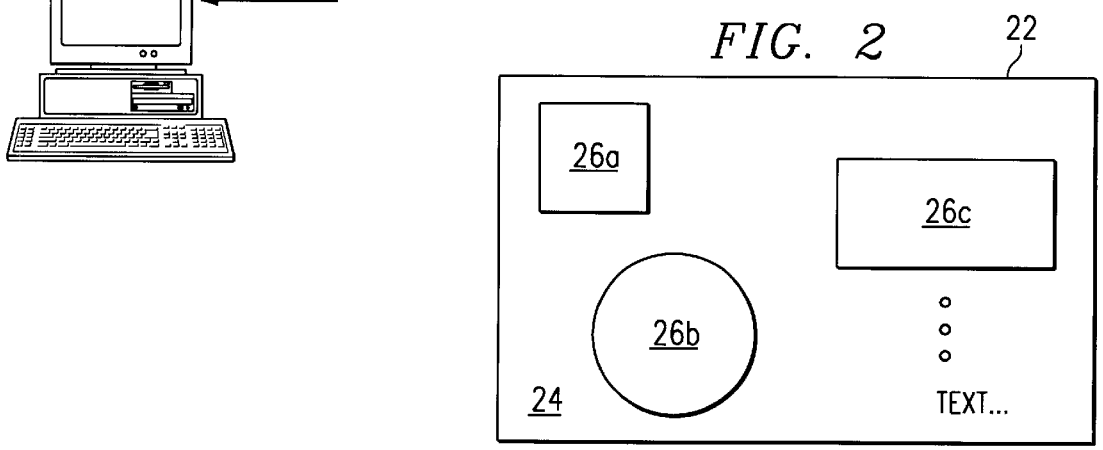
FIG. 2 is a simplified illustration of an image template according to the present invention.

The present invention is a method and system for extracting Web-based image content from content provider or source web sites for use by a hosting or "pass-through" web site. As a web page is returned to a given client machine, that page includes a composite that is built "on-the-fly" from one or more image elements served from the content provider web sites and assembled at the hosting site. The composite is defined according to a template, which is a file having a background and a set of one or more missing graphical regions that are selectively filled by image objects retrieved from the content provider sites. FIG. 2 illustrates a representative composite template 22 that includes background 24 (which may be text, graphics or other elements), and the set of one or more graphical regions 26a–26n. Each graphical region is a set of pixels that is missing image data. As illustrated in FIG. 2, the graphical region may be any convenient regular or irregular shape such as a square, polygon, circle, ellipse, or the like. A given geographical region is filled according to the invention with graphics data retrieved from a given content provider site. Alternatively, the graphics data used to fill a given pixel set in a geographical region in the template is obtained locally from the hosting site itself. According to the invention, the graphics data that fills the geographic region is transformed prior to being composited into the template.

A transform is any of a set of well-known image manipulations. They include, for example, scaling, mirroring, cutting, cropping, inverting, flipping, reversing, rotating, color shifting, or combinations of the above. As an example, a given transform may change alter an image object to change the object from a colored object to a black and white object. A given transform may adjust the saturation or hue of a given image object. Another transform scales the object, and another transform is used to crop or rotate the object. A set of transforms (or one combined transform) may scale, crop and color adjust a given image object prior to filling the resulting object into the template. A given transform may also be a function that does not alter the image object prior its placement into the template. Of course, the above examples are merely representative.

Figure 3:
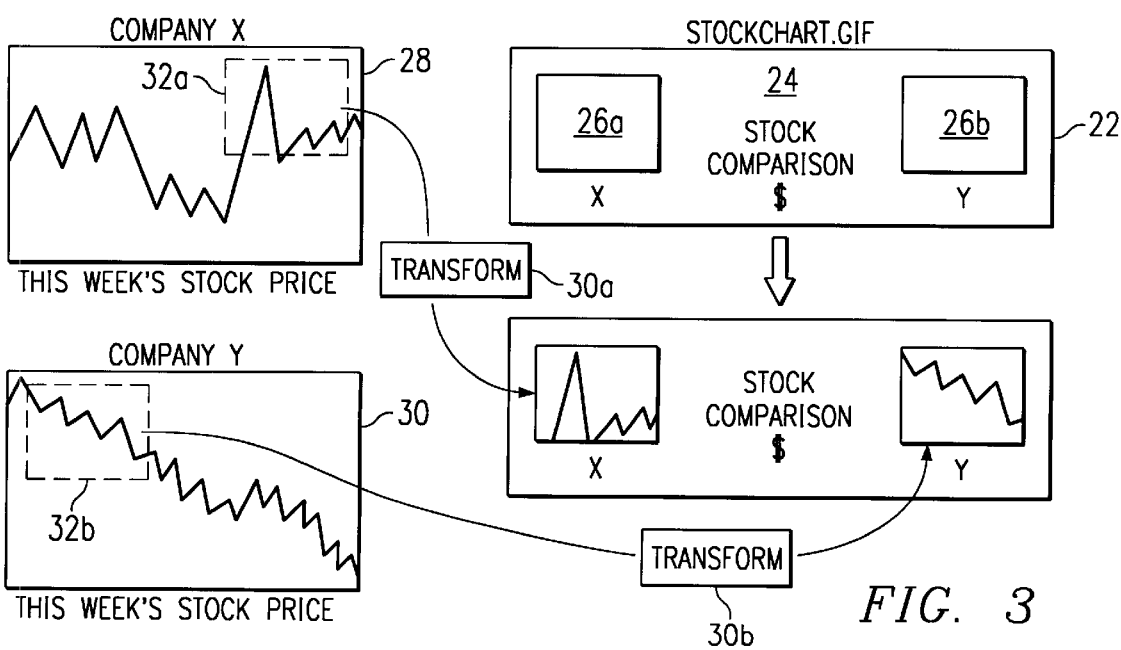
FIG. 3 is an illustrative example of how a pair of image objects are selectively retrieved, transformed and then assembled into a template according to the present invention.

FIG. 3 illustrates the inventive process in more detail. In this example, the template is a stock chart, called stockchart.gif, that compares the stock price of two stocks, Company X and Company Y. The template 22 includes the background 24 and two graphical regions, 26a and 26b, that are to be filled in "on-the-fly" as the object is served to a requesting client browser. FIG. 3 also illustrates the Company X image object 28, and the Company Y image object 30. For purposes of illustration, it is assumed that Company X image object 28 is supported on a first content provider site, while Company Y image object 30 is located on a second content provider site. As noted above, this is not a limitation of the present invention, as the given image objects that are used to fill a given template may be located anywhere in the network. Given that Company X and Y are likely to present their stock data in different formats (e.g., over a different timebase or according to a different scale, or the like), it is desirable to transform these objects prior to their inclusion into the template. If this transformation is not done, then the resulting composite created by filling in the template will be inaccurate and, quite possibly, misleading.

Thus, according to the invention, a first transform 30a (in this example) crops and scales the Company X image object into the transformed image object 32a prior to positioning that transformed object into the template. Likewise, a second transform 30b crops and scales the Company Y image object into the transformed image object 32b prior to positioning that transformed object into the template. Thus, in this example, the resulting stockchart.gif compares the stock performance of the two companies by compositing corresponding image elements from two distinct sources into a third image, namely, the composite, as defined by the template. The third image is the image returned to a client browser when an object reference to stockchart.gif is requested.

Figure 4:
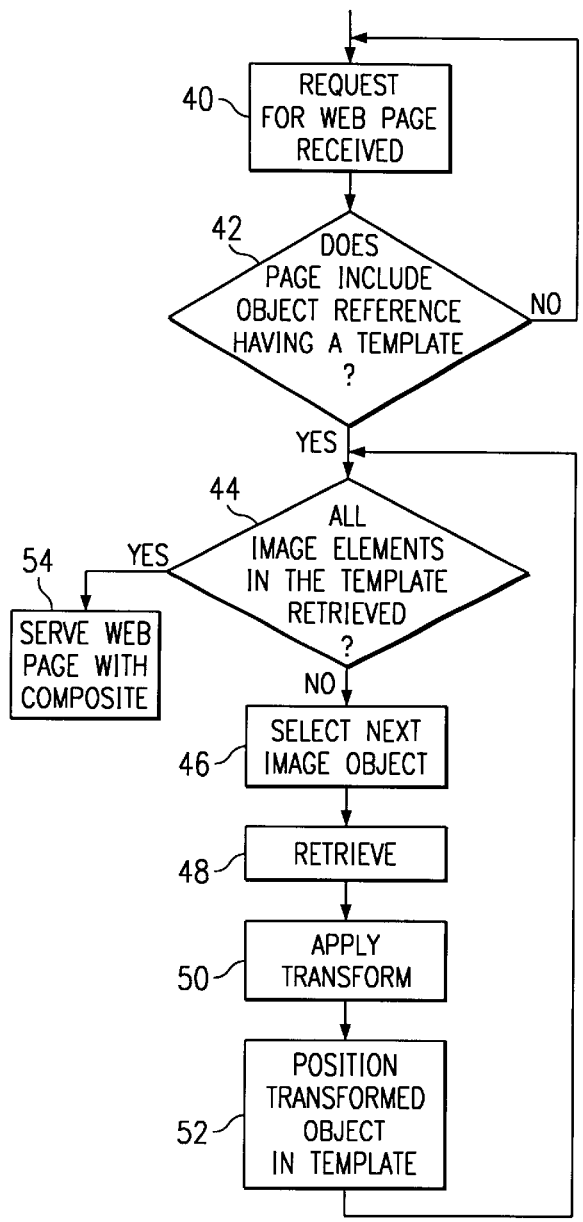
FIG. 4 is a flowchart illustrating how the inventive image reuse process is implemented in response to a request for a web page that includes a template-based image.

FIG. 4 is a flowchart of the inventive method for reusing image data. The routine assumes that an image template has been created for a given object reference in a web page. As illustrated above, the template includes one or more graphical regions that are adapted to be filled in "on-the-fly" as the web page is served to a requesting client browser. The routine preferably is operable at a hosting site, such as a web server. In one preferred embodiment, the routine is implemented as a set of instructions, namely a computer program, that is executed by a processor. The routine begins at step 40 when a request for a given web page is received at the server. At step 42, a test is made to determine whether the requested web page includes at least one given object reference for which a template exists. If not, the routine returns to step 40. If, however, the routine includes a given object reference for which a template exists, the routine continues at step 44 to test whether all image elements in the template have been retrieved. If the outcome of the test at step 44 is negative, the routine continues at step 46 to select the next image object in the template. At step 48, the image object is retrieved. Generally, the image object is retrieved from a content provider site located elsewhere in the network. At step 50, a transform is applied to the retrieved image object. As noted above, a transform applies a given image manipulation (or perhaps none at all) to the retrieved image object. Step 50 creates a transformed image object. At step 52, the transformed image object is positioned into the template at the desired location. Control then returns to step 44. When all transformed image objects are positioned within the template, the result of the test at step 44 is positive. Control then branches to step 54, wherein the web page including the composite is served to the requesting client browser. This completes the process.

Figure 5A:
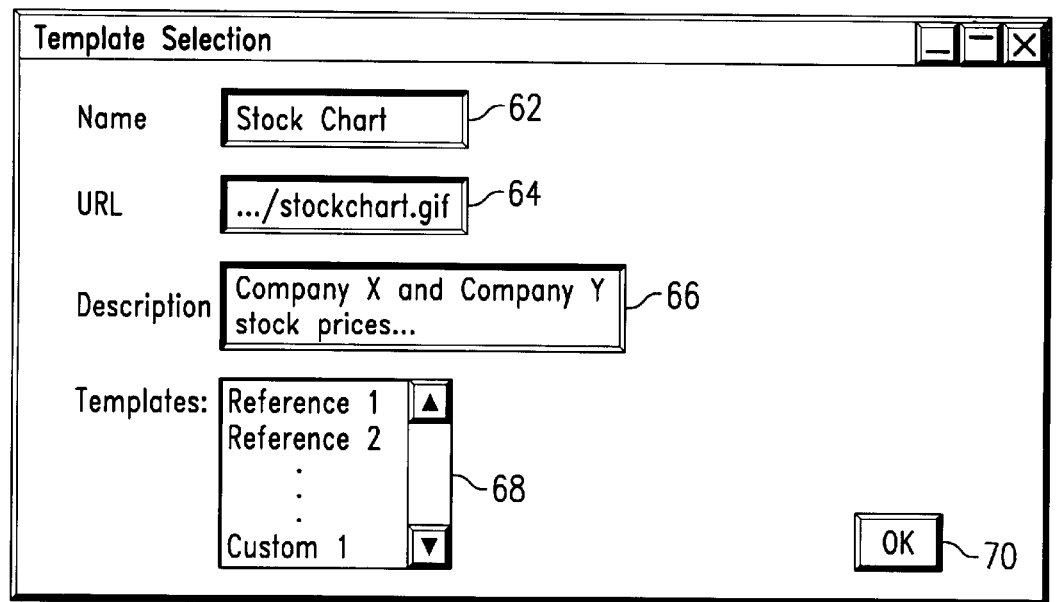
FIGS. 5A–5B comprise a representative user interface for use in defining a template and the image object(s) that are used to build a composite image according to the present invention.
Figure 5B:
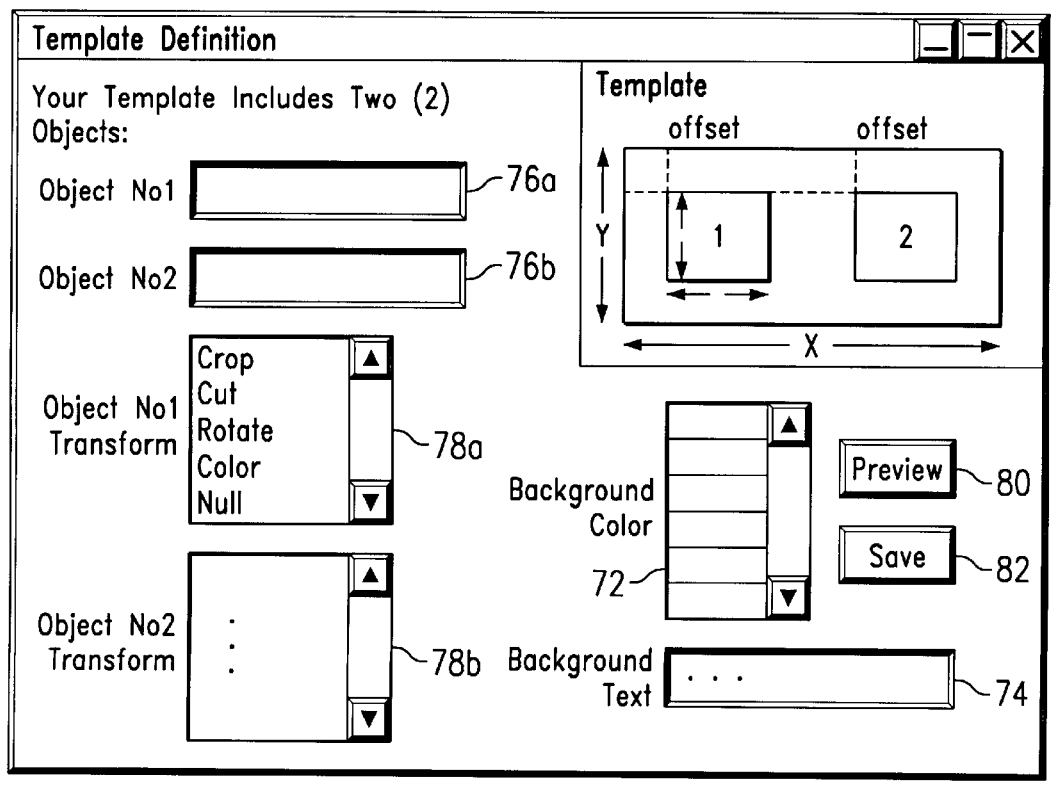

Thus, according to the present invention, a given web page is served to a client browser with at least one composite image generated by incorporating one or more transformed image objects into a reference image template. The invention enables a publisher at a host site (or elsewhere) to define a template and to identify the location(s) from which the image objects that fill that template are to be sourced. FIGS. 5A–5B illustrate a representative user interface for use in the definition process. The user interface includes a template-selection panel 60 as illustrated in FIG. 5A. The name of the template is provided by the publisher in field 62. In this example, the template is called "stock chart." This template is associated with a given URL object reference, as identified in the URL field 64. In this example, the object reference is stockchart.gif, as previously illustrated. Thus, whenever a web page includes the URL object reference for stockchart.gif, the template stock chart is retrieved and processed according to the routine described above with respect to FIG. 4. A comment field 66 may be used to further define the subject matter of the template. In this case, the publisher has identified that the chart is a composite of "Company X and Company Y stock prices for a given time period." A listbox 68 includes a drop down list of reference templates that may be selected for use. A reference template is a template whose characteristics (e.g., its size, the location and configuration of each missing graphical region, etc.) are predefined for ease of use. Alternatively, the interface may include appropriate controls to enable a publisher to create and save a new template. After the publisher has selected template for use (or created his or her own new template), the publisher selects the OK button 70. This opens the template-definition panel as illustrated in FIG. 5B.

The template-definition panel provides a graphical illustration of the template. Thus, the publisher can readily see the number and location of the missing geographical elements. Using the listbox 72, the publisher selects a given background color or style. Given information (e.g., text) that is entered into the field 74 becomes part of the template background. Each missing geographic element in the template is also identified. To complete the template, the publisher enters a fully-qualified URL into field 76a and then selects a transform to be applied to that image object from listbox 78a. Likewise, the publisher then enters a fully-qualified URL into field 76b and then selects a transform to be applied to that image object from the listbox 78b. Once all portions of the template have been specified, the publisher may preview the composite image by selecting the Preview button 80. The template may then be saved by selecting the Save button 82.

Figure 6:
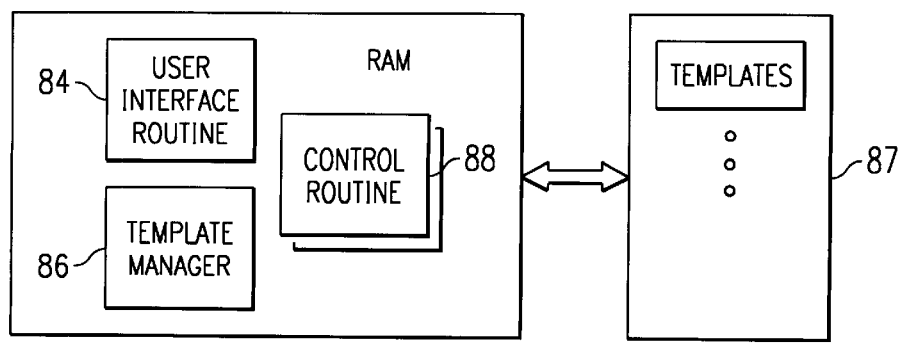
FIG. 6 is a simplified illustration of the various component routines of the inventive method.

Preferably, during a configuration process, the publisher at the hosting site uses the interface described above to create a set of image templates that are then saved at the server. FIG. 6 illustrates the basic functional components that are used to achieve this operation. As noted above, the invention is preferably implemented as a computer program. In FIG. 6, this program is supported in system memory 85, such as a RAM, and comprises a number of functions. They include a user interface routine 84 that is used to generate and manage the template definition, a template manager 86 that is used to manage the saving and retrieval of templates in storage 87 (such as a hard disk), and a control routine 88 that parses received requests for web pages. In particular, when a given request for a web page that includes a template is received, a new instance of the control routine 88 is spawned to manage the assembly of the composite image as has been previously described and illustrated. Once the composite has been served back to the requesting client browser, the control routine instance is terminated.

Using the present invention, the end user receives a page with a composite image generated from a template at the hosting web site. That composite image includes one or more image objects defined by the template and that are typically served from one or more content providers located elsewhere in the network. Thus, as the image objects change (on their sites), those changes are automatically reflected in the composite that is served to the end user.

If desired, the various object elements fetched from the content provider sites may be cached in a local cache on the hosting server for faster access and guaranteed access in the event that the content provider site(s) become inaccessible. In this way, if the composite has not changed, e.g., since the pass through publisher last polled the site, the composite image object elements are retrieved from the local cache. This reduces Internet bandwidth requirements and improves performance on both the hosting web server and the web content provider server.

According to another embodiment of the present invention, a given template may be programmatic. Thus, for example, rather than using a preexisting or static template, a given template may be built "on-the-fly" in a dynamic manner, or a particular template may be selected as a function of given information in the user request. As an example, when the client request is received, it may be parsed for given identifying information, such as the user's IP address, which is then used to identify a given template for hosting the given image data. As another example, a user may be asked to fill in a given form (e.g., using a CGI script) that identifies the user's address or other identifying information, and this information then dictates the template that will be used (and/or created) to respond to the particular request. Thus, a user that resides in a given zip code would receive images mapped into a first template file while a user that resides in a different zip code would receive images mapped into a second template file. Yet another example is to use different templates as a function of the time of day that the user request is received, or the type of user, or whether the user has registered for a given service or class of service. The above examples, of course, are merely representative.

Thus, according to the invention, when a given client request is received at the server, additional processing may be carried out to determine whether a dynamic template is to be used. If so, the template is then fetched and/or created, as required, and the remainder of the image processing is carried out in the manner previously described.

An alternative embodiment to the invention is to provide a client-based Java applet that retrieves dynamic content from the web content provider's server directly from the end user's browser. This allows the recast page to be loaded from the hosting site's cache to the client browser and invoking the Java applet for the retrieval of marked dynamic content. This reduces the network bottleneck at the hosting site.

The invention provides a mechanism that allows a hosting web site to provide a wide variety and great amount of third party Web-based image content without incurring high licensing costs. Another benefit of the pass through system is in cost savings. Unlike a traditional system of licensing and republishing content, the hosting system does not require a large production staff since the republishing and re-styling of the content is automatic. A hosting system can provide a much faster production cycle and assure that the content does not quickly go "out of date".

A representative server is an IBM Netfinity server comprising a RISC-based processor, the AIX® operating system, a web server application, and the inventive image reuse program. The server typically includes a GUI, and an application programming interface (API) that provides extensions to enable application developers to extend and/or customize the core functionality thereof through software programs including plug-ins, servlets, and the like.

A representative client is a personal computer, notebook computer, Internet appliance or pervasive computing device (e.g., a PDA or palm computer) that is x86-, PowerPC®- or RISC-based. The client includes an operating system such as IBM® OS/2®, Microsoft Windows, Microsoft CE or PalmOS. As noted above, the client includes a suite of Internet tools including a Web browser, such as Netscape Navigator 4.0 (or higher), that has a Java Virtual Machine (JVM) and support for application plug-ins or helper applications.

The present invention provides numerous advantages. Generally, the invention reduces the expense and effort of providing content in a hosting web site. The technique enables the efficient reuse of image content obtained from other web sites, and it enables a hosting site to adapt image content from other web sites to the appearance of the hosting web site so that the image content from a plurality of web sites appears native to the hosting web site. The technique further allows the hosting site to automatically update graphical material as it is changed on content provider web sites. This reuse of web-based image content is accomplished without requiring content provider web sites to modify content or install special purpose software. As a by-product, a publisher of an electronic document having graphical objects can control the reformatting of the document by a hosting site.

As noted above, the above-described functionality preferably is implemented in software executable in a processor, namely, as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, as used herein, a Web "client" should be broadly construed to mean any computer or component thereof directly or indirectly connected or connectable in any known or later-developed manner to a computer network, such as the Internet. The term Web "server" should also be broadly construed to mean a computer, computer platform, an adjunct to a computer or platform, or any component thereof. Of course, a "client" should be broadly construed to mean one who requests or gets the file, and "server" is the entity which downloads the file.

Having thus described our invention, what we claim as new and desire to secure by letters patent is set forth in the following claims:

What is claimed is:

1. A method for processing image data, the method comprising:

responsive to a request from a client browser for a web page, determining whether the web page includes a given object reference;

if the web page includes the given object reference, retrieving at least first and second image objects;

applying a given transform to the first image object to produce a modified first image object in accordance with a template, wherein the template defines a missing graphical area within a background image;

generating a composite image object with the modified first image object positioned within a graphical area in the second image object as the background image in accordance with the template; and serving the web page including the composite image object to the client browser in response to the request.

2. The method as described in claim 1 wherein the first image object or the second image object is retrieved from a content server.

3. The method as described in claim 1 wherein the first image object or the second image object is retrieved from a local server.

4. The method as described in claim 1 wherein the missing graphical area has a given shape.

5. The method as described in claim 1 wherein the given transform is selected from a set of transforms consisting essentially of: scaling, mirroring, cutting, cropping, inverting, flipping, reversing, rotating, color shifting, and combinations thereof.

6. The method as described in claim 1 wherein the given transform is a null transform.

7. The method as described in claim 1 wherein the template file is selected as a function of given information in the request.

8. The method as described in claim 1 wherein the template file is associated with the given object reference.

9. A computer program product in a computer readable medium for use in a data processing system, the computer program product comprising:

means for determining, responsive to a request from a client browser for a web page, whether the web page includes a given object reference;

means for retrieving at least first and second image objects if the web page includes the given object reference;

means for applying a given transform to the first image object to produce a modified first image object in accordance with a template, wherein the template defines a missing graphical area within a background image;

means for generating a composite image object with the modified first image object positioned within a graphical area in the second image object as the background image in accordance with the template; and means for serving the web page including the composite image object to the client browser in response to the request.

10. The computer program product as described in claim 9 wherein the first image object or the second image object is retrieved from a content server.

11. The computer program product as described in claim 9 wherein the first image object or the second image object is retrieved from a local server.

12. The computer program product as described in claim 9 wherein the missing graphical area has a given shape.

13. The computer program product as described in claim 9 wherein the given transform is selected from a set of transforms consisting essentially of: scaling, mirroring, cutting, cropping, inverting, flipping, reversing, rotating, color shifting, and combinations thereof.

14. The computer program product as described in claim 9 wherein the given transform is a null transform.

15. The computer program product as described in claim 9 wherein the template file is selected as a function of given information in the request.

16. The computer program product as described in claim 9 wherein the template file is associated with the given object reference.

17. An apparatus for processing image data, the apparatus comprising:

means for determining, responsive to a request from a client browser for a web page, whether the web page includes a given object reference;

means for retrieving at least first and second image objects if the web page includes the given object reference;

means for applying a given transform to the first image object to produce a modified first image object in accordance with a template, wherein the template defines a missing graphical area within a background image;

means for generating a composite image object with the modified first image object positioned within a graphical area in the second image object as the background image in accordance with the template; and means for serving the web page including the composite image object to the client browser in response to the request.

18. The apparatus as described in claim 17 wherein the first image object or the second image object is retrieved from a content server.

19. The apparatus as described in claim 17 wherein the first image object or the second image object is retrieved from a local server.

20. The apparatus as described in claim 17 wherein the missing graphical area has a given shape.

21. The apparatus as described in claim 17 wherein the given transform is selected from a set of transforms consisting essentially of: scaling, mirroring, cutting, cropping, inverting, flipping, reversing, rotating, color shifting, and combinations thereof.

22. The apparatus as described in claim 17 wherein the given transform is a null transform.

23. The apparatus as described in claim 17 wherein the template file is selected as a function of given information in the request.

24. The apparatus as described in claim 17 wherein the template file is associated with the given object reference.

\* \* \* \* \*